US006022115A

United States Patent [19]

Borra et al.

[11] Patent Number: 6,022,115

[45] Date of Patent: Feb. 8, 2000

[54] OPTICAL SYSTEM FOR OPTICAL BEAM SCANNING

[75] Inventors: Ermanno Borra, St-Ferreol; Simon Thibault; Stan Szapiel, both of Ste-Foy, all of Canada

[73] Assignee: Université Laval, Ste-Foy, Canada

[21] Appl. No.: 09/097,262

[22] Filed: Jun. 15, 1998

[51] Int. Cl.[7] .............................. G02B 5/10; G02B 7/182

[52] U.S. Cl. .......................... 359/859; 359/860; 359/858; 359/861; 359/862; 359/863; 359/865

[58] Field of Search .................................... 359/859, 860, 359/861, 862, 863, 864, 865, 858, 871, 872, 857; 343/761, 755, 758, 766, 781 P, 781 CA

[56] References Cited

U.S. PATENT DOCUMENTS

| | | | |
|---|---|---|---|
| 2,697,379 | 12/1954 | Walker | 359/858 |
| 4,042,933 | 8/1977 | Lapp | 343/761 |

OTHER PUBLICATIONS

Proceedings of SPIE “Sensors, Sensor Systems, and Sensor Data Processing”, vol. 3100—Jun. 16–17, 1997—Munich, FRG.

*Primary Examiner*—Cassandra Spyrou
*Assistant Examiner*—Mohammad Y. Sikder
*Attorney, Agent, or Firm*—James Anglehart; Swabey Ogilvy Renault

[57] ABSTRACT

The present invention is directed to an optical system for measurement of a three dimensional device. The optical system is designed and configured to meet telecentric and f-θ requirements. The system employs primary and secondary mirrors operating in conjunction with a tertiary deflector mounted on a pivot. Light from a light source produces a beam which is deflected off the deflector and the secondary and primary reflectors respectively. The beam is then transmitted to the surface of the object to be measured. Deflection of the tertiary deflector on the pivot results in scanning of the light beam across the surface of the object to be measured.

14 Claims, 5 Drawing Sheets

Primary mirror
Secondary mirror
ray 1
ray 2
pivot
focus
x'=afθ
z'(x')
z(x)
θ
θi
cf
bf
f
1
10
15
20

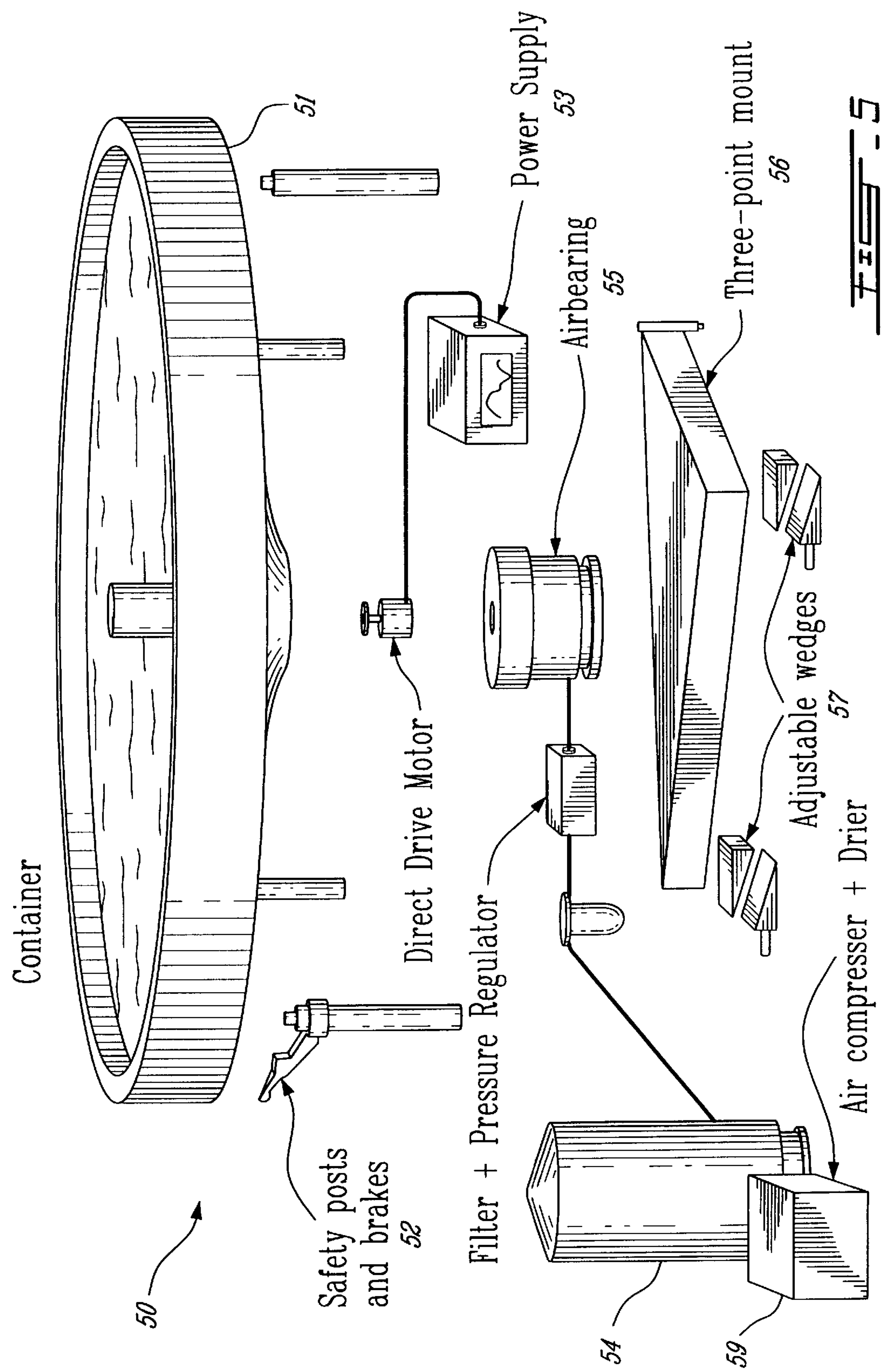
FIG_5

OPTICAL SYSTEM FOR OPTICAL BEAM SCANNING

FIELD OF THE INVENTION

The present invention relates to an optical system for beam scanning of a surface, and in particular, an optical system which uses beam scanning for measurement of an object, which meets the definition of an f-θ and telecentric system.

BACKGROUND OF THE INVENTION

This invention relates to a reflective optical system that allows a focused beam to scan a surface while respecting simultaneously the f-q and the telecentric conditions. The f-θ condition is one in which the scanning angle has a linear relationship with the position of the focused beam on the surface to be scanned. The telecentric optical system is characterized by the fact that the scanning beam has a constant direction and shape. Driven by practical applications, there has been enormous progress in optical scanning over the past several years. However, while much effort has gone to improving the software, relatively little has been done to improve the optical scanning systems themselves. On the other hand, it is possible to simplify considerably the task of the software by designing more sophisticated optical systems which operate at higher speeds and greater accuracy. An f-q telecentric optical system constitutes such a desirable hardware improvement. By introducing the desired amount of distortion in the optical system it is possible to obtain a nearly linear relation between the scanning angle q and the position of a focused beam on the surface to be scanned. If the direction and shape of the beam can also be maintained constant, the systems meets both the f-θ and telecentric requirements.

BRIEF SUMMARY OF THE INVENTION

It is a feature of the present invention to provide a large volume three dimensional measurement system which maintains the above described f-θ and telecentric conditions, so as to permit fast and accurate scanning.

In accordance with the above features, from a broad aspect, the invention provides an optical system for large volume three dimensional measurement. The optical system incorporates a primary reflector, a secondary reflector means and a light source wherein said primary reflecting means and said secondary reflecting means are fixed in position relative to each other. The system also includes a tertiary deflector that it is capable of pivoting. The light source projects a light beam which reflects off the tertiary deflector, secondary reflector and primary reflector for transmission to the surface of the object to be measured. The light source projects the light beam to the secondary reflector at an angle to a predetermined axis. This angle has a linear correspondence with the position of the beam on the object. Pivoting of the tertiary deflector permits the scanning of the light source across the object to be measured.

In accordance with the above features, from a second broad aspect, the optical system further includes primary and secondary reflectors, and a tertiary deflector for reflecting a light beam such that it is transmitted to the surface of an object to be measured. The tertiary deflector includes a system for pivoting this deflector in response to a control signal. The reflectors are arranged in such a manner that the position of the light beam on the object to be measured has a linear relation with the control signal.

BRIEF DESCRIPTION OF THE DRAWINGS

FIG. 5 is an exploded diagram illustrating the mechanical elements necessary for the liquid mirror operation.

DETAILED DESCRIPTION OF THE PREFERRED EMBODIMENT

Figure 1:
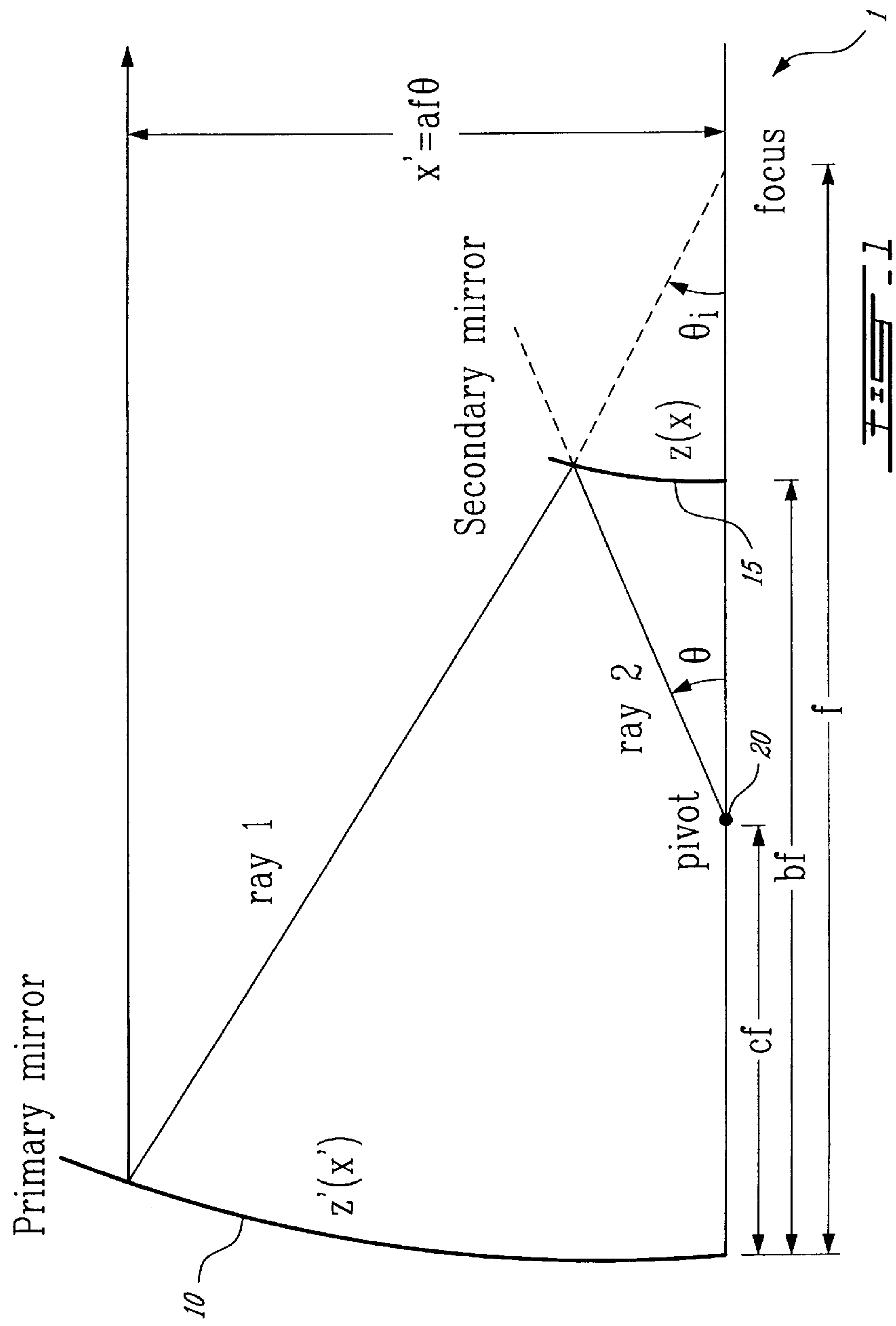
FIG. 1 discloses the basic elements of the of the optical system, along with the various design parameters.
Figure 2:
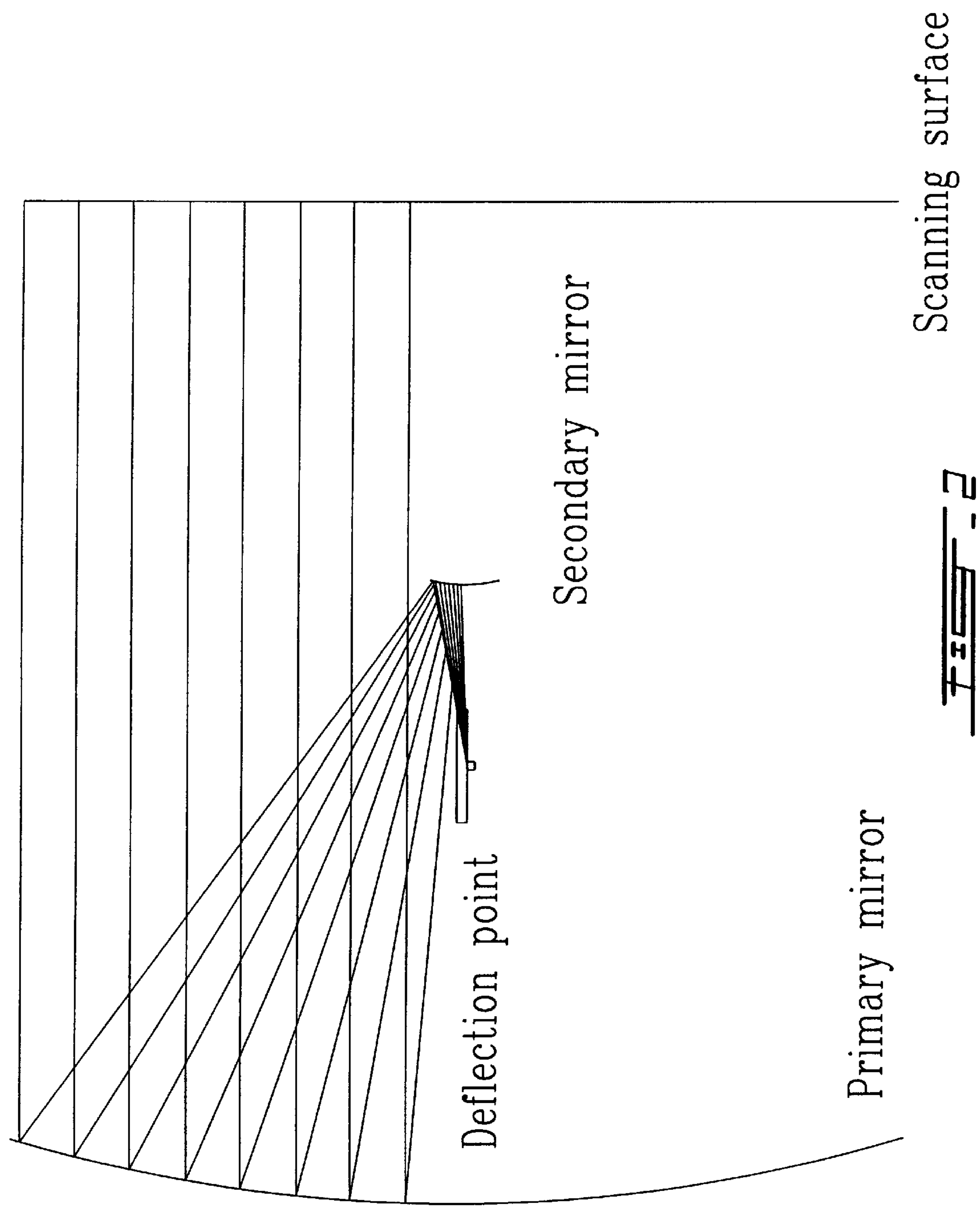
FIG. 2 show the paths of light beams in the optical system of the present invention.

The main optical elements of the f-q telecentric system 1 consists of a concave primary mirror 10 facing a smaller convex mirror 15. The mirror 15 faces the pivot 20 so that the pivot is placed between the two mirrors. The pivot 20 supports a pivoting mirror or deflector, which receives and reflects a beam of light from a light source (not shown). The pivoting mirror may also be driven motorized system that responds to a control signal from the operator. The beam of light is preferably a laser source, and is preferably positioned below the pivot 20 as shown in FIG. 1. However, the position of the source of light and the nature of the light source may vary, and the invention is not intended to these particular preferred embodiments.

The optical system of the present invention operates by transmitting a light beam from the light source which reflects off the pivoting deflector, the secondary convex mirror and the primary concave mirror for transmission to the surface of the object to be measured. Pivoting the pivotally mounted deflector at 20 causes the light beams to scan across the measured object along the vertical length x'.

The relation z'(x') describes the surface of the primary mirror and the relation z(x) the surface of the secondary mirror. The position x' is the position of the scanning beam along the object to be measured. The constant "a" is a constant that, while preserving the f-q and telecentric conditions, allows one to introduce a correction to the optical magnification. The constant "a" and its implications in this optical system are further discussed with respect to the mathematical equations which follow.

The optical ray 2 comes from the pivot at an angle q with respect to the optical axis of the system. The optical ray 1 reflected from the secondary is at an angle $q_i$ with respect to the optical axis of the system. The distance between the primary and secondary mirror is a fraction b of the focal length f of the primary and the distance from the center of the primary to the pivot is a fraction c of f. To satisfy the f-q condition, there must obtain a linear relation between the scanning angle q and the position x' with a slope given by "a x f" the product of "a" and "f" which were previously defined. To satisfy the telecentric condition, the exit pupil of the system must be at infinity so that the stop of the system must coincide with the focus at distance f. In such an optical configuration the light rays coming from the focus will be reflected by the mirror parallel to each other.

If the pivoting mirror is driven by a motor or transducer, which is controlled by a control signal, then it is also possible, in the f-θ design condition, to have the position of the light beam on the object related linearly to the magnitude of the control signal. The deflecting mirror can also be replaced by any optical element that allows the deviation of a beam of light. The element could be a polygon, a galvanometer, an electro-optical system, a holographic element a diffractive element, or other types of deflective elements known and understood in the art. In addition, the secondary mirror can be replaced by a refractive optical element, a diffractive optical element or a hybrid refractive-diffractive element.

Considering the above discussion, the invention can be described mathematically, within the paraxial approximation, so that a choice of primary mirror imposes, mathematically, a shape for the secondary mirror. On the secondary mirror, ray 1 is described by $$x=[(1-b)f-z]\tan\theta_i. \quad (1)$$

Ray 2 is described by $$x=[(b-c)f+z]\tan\theta. \quad (2)$$

From these 2 equations one can then obtain the surface of the secondary mirror described by $$z=\frac{[(1-b)\tan\theta_i-(b-c)\tan\theta]}{\tan\theta_i+\tan\theta}, \quad (3)$$

with $$\theta_i=2\tan^{-1}\left(\frac{a\theta}{2}\right). \quad (4)$$

The surface of the secondary mirror only makes physical sense if the condition $$a=\frac{b-c}{1-b} \quad (5)$$

is respected. One can therefore see that one has a large number of possible solutions depending on the values chosen for b and c provided the condition in equation 5 is respected. One obtains the shape of the secondary mirror by converting the dependence on q to a dependence on x with equations 1 and 2. It is possible to obtain a polynomial solution $$z(x)=Ax^2+Bx^4+Cx^6+ \quad (6)$$

by a least squares fit to the solution. The constants A, B, C are the aspheric coefficients describing the surface. Most optical design software packages can handle an aspheric term described by equation 6.

The invention allows reflecting systems having arbitrary dimensions. A reflective optical system allows a large spectral range. These two very important characteristics allows one to apply the invention to RGB (Red, Green, Blue) white light scanning systems that can scan large objects.

Example of Preferred Embodiment

In the preferred embodiment of the present invention, the primary mirror is a liquid mirror having a diameter of 1.2 meters and a focal length of 1 meter. A parabolic mirror is an ideal choice since it is naturally telecentric. We chose a liquid mirror for the main reasons that it is a parabolic mirror and that the technology allows one to construct large reflecting mirrors at low costs. Using a solid mirror (such as one made out of glass or metal) is possible and would not have made any significant change to the embodiment. The secondary mirror is aspheric. It has a diameter of 100 millimeters. The shape of its surface has been computed with the equations defined in the brief summary of the invention. The parameter A, B, C used are given in the table.

| Parameter | Primary mirror | Secondary mirror |
|---|---|---|
| Radius of curvature (mm) | −2000 | — |
| Conic constant | −1 | — |
| A | — | 2.45 × 10-4 |
| B | — | −2.16 × 10-8 |
| C | — | 1.44 × 10-12 |

The pivot consists of a flat circular mirror having a diameter of 25.4 millimeters mounted on a rotating stage. A He—Ne laser emitting at a wavelength 632.8 nanometers is placed at 165 millimeters from the pivot. The beam emitted by the laser is sent perpendicularly to the optical axis of the system. The distance between the pivot and the secondary mirror is 350 millimeters. The distance between the primary mirror and the secondary mirror is 933 millimeters. A 5 millimeter thick biconcave lens made of BK7 glass and having a focal length of −90 millimeters is placed between the pivot and the secondary mirror at a distance of 85 millimeters from the pivot. This lens allows one to obtain a diffraction-limited spot size of 0.87 millimeters over the surface to be scanned. Without this lens the spot size, still diffraction-limited, would be 1 millimeter.

Figure 3:
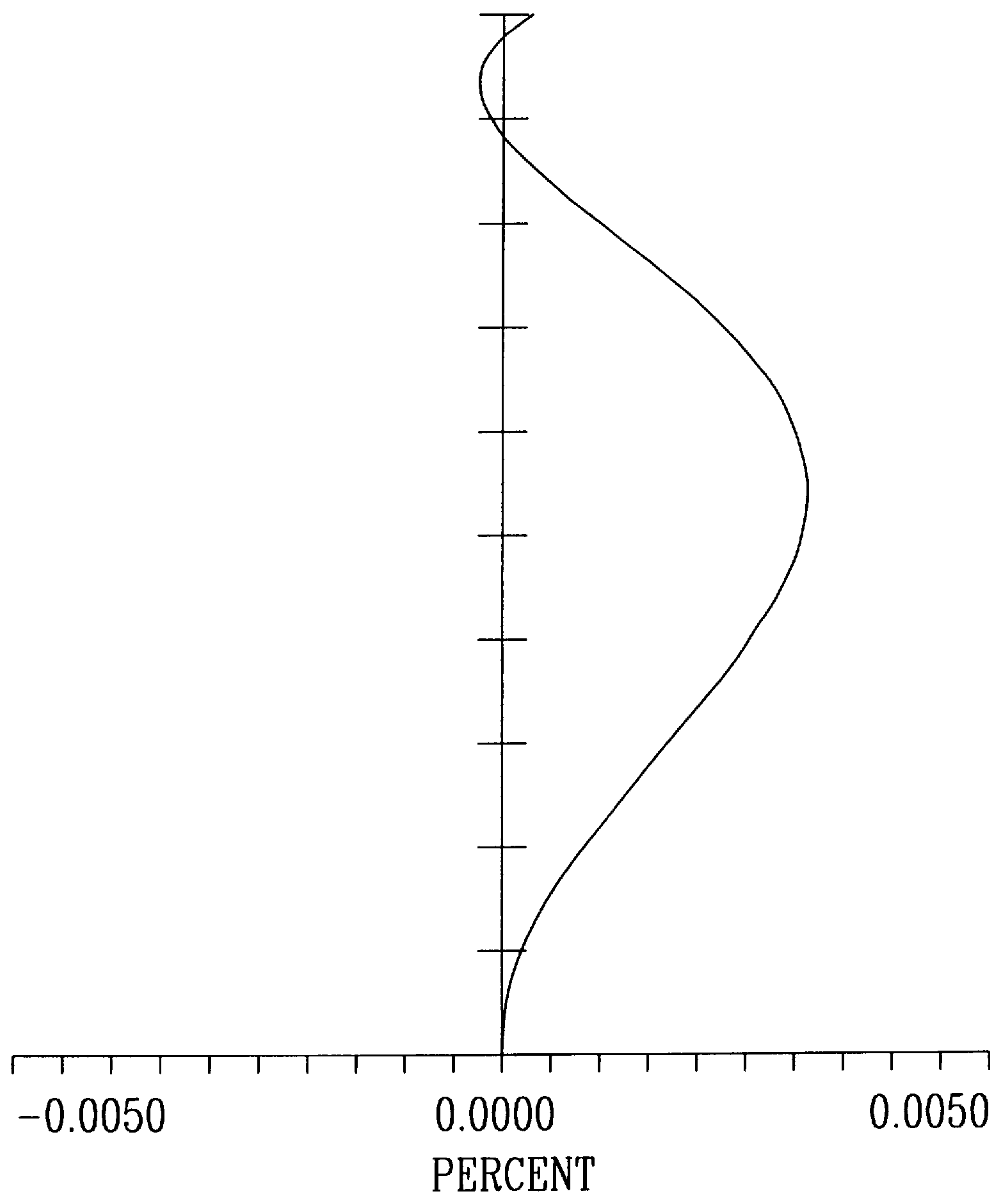
FIG. 3 is a graph illustrating the deviation in percent from the perfect linearity between the scan angle θ and the position of the beam on the object being scanned.

The system thus described obeys the relations given by equations (1) and (2) and therefore obeys the f-q condition and is telecentric. FIG. 3 gives a curve that shows the deviation (in percents) with respect to the perfect linear relation on the scanning surface 1.5 meters from the primary mirror in the direction of propagation. Telecentricity is observed by computing the position of the exit pupil of the system. The stop is defined by the width of the beam on the flat mirror at the pivot point. For the system described in this embodiment, the exit pupil is placed 1.1 kilometers above the primary mirror in the direction of propagation of the beam. The angular spread of the beam is within 0.2 arc minutes.

Figure 4:
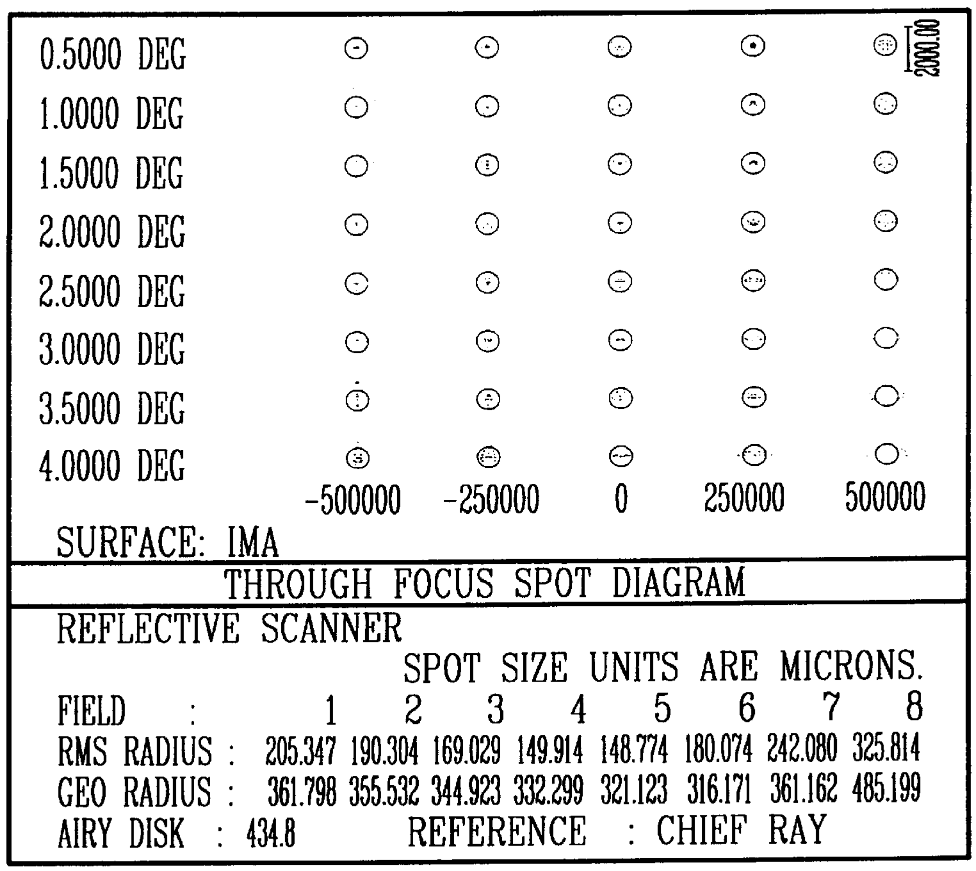
FIG. 4 is a diagram illustrating the variation in the beam spot sizes as they appear at various positions on the object being measured and at various scan angles.

FIG. 4 shows spot diagrams inside a scanning volume 1 meter deep and 0.85 meters wide. Inside that volume, the spot is almost always diffraction-limited.

FIG. 5 illustrates a preferred embodiment for the reflecting mirrors utilized in the present invention. The reflecting mirror system 50 includes a container 51 containing a liquid reflective material. The liquid reflective material is preferably mercury, although other types of liquid reflective materials may be utilized. The container 51 containing the liquid reflective material is connected to a powered drive motor 52 which drives the container 51 containing the liquid. The container 51 is in turn supported on an air bearing 55 which is pressurized by an air compressor 59 and pressure regulator/filter 54. The air bearing 55 is in turn mounted on a three point mount 56 which is supported at a level position by adjustable wedges 57.

The rotation of the container 51 by the drive motor 53 applies centrifugal forces to the liquid of the mirror. These forces, combined with the normal gravitational forces cause the mirror to assume a parabolic shape, without distortion. Such liquid mirrors are also extremely economical to use, since they cost far less to set up and manufacture than solid mirrors.

What is claimed is:

1. An optical system for large volume three dimensional measurement, comprising:

a large surface area primary reflection means for reflecting a beam of light toward a three dimensional object;

secondary reflection means for reflecting said beam of light toward said primary reflection means, wherein said primary reflecting means and said secondary reflecting means are fixed in position relative to each other;

tertiary reflection means for directing said beam of light from a light source to said secondary reflection means;

wherein said light beam projects through a focal point of said primary reflection means and reflects off the secondary and primary reflection means for transmission to a surface of the three dimensional object with said beam being reflected toward the three dimensional object from said primary reflection means while remaining, within a field of view of said optical system substantially parallel to an axis, such that said optical system is telecentric, and wherein a change in an angle of said beam directed from said tertiary reflection means results in a corresponding linear change in a position of said beam on said object.

2. The optical system as defined in claim 1, wherein said primary reflection means is a concave mirror.

3. The optical system as defined in claim 2, wherein said secondary reflection means is a convex mirror.

4. The optical system as defined in claim 1, wherein said primary, secondary and tertiary reflection means are solid mirrors.

5. The optical system as defined in claim 1, wherein said primary reflection means is a rotating liquid mirror.

6. The optical system as defined in claim 5, wherein said secondary mirror is a solid mirror.

7. The optical system as defined in claim 1, wherein said light source is a laser source.

8. The optical system as defined in claim 1, wherein said predetermined axis is an axis common to both said primary and secondary reflection means.

9. The optical system as defined in claim 1, wherein said predetermined axis intercepts a focal point of said primary reflection means.

10. The optical system as defined in claim 1, wherein said primary reflection means defines a focal length, and said secondary reflection means is located at a position which is first fraction of said focal length, and said light source is located at a position which is a second fraction of said focal length.

11. The optical system as defined in claim 10, wherein said light source projects a light beam towards said secondary reflection means at a first angle with respect to said predetermined axis and said light beam reflects off said secondary reflection means at a second angle with respect to said predetermined axis, and wherein a surface shape of said secondary mirror is functionally related to said focal length, said first angle, said second angle, said first fraction and said second fraction by a functional relationship.

12. The optical system as defined in claim 11, wherein said functional relationship is:

$$z = \frac{[(1-b)\tan\theta_i - (b-c)\tan\theta]}{\tan\theta_i + \tan\theta}$$

with

-continued $$\theta_i = 2\tan^{-1}\left(\frac{a\theta}{2}\right)$$

and $$a = \frac{b-c}{1-b}$$

where f is the focal length of said primary reflection means;

b is said first fraction;

c is said second fraction;

θ is said first angle $\theta_i$ is said second angle;

Z is the variable defining the coordinates of surface shape.

13. An optical system for large volume three dimensional measurement, comprising:

a large surface area primary reflection means for reflecting a beam of light toward a three dimensional object;

secondary reflection means for reflecting said beam of light toward said primary reflection means, wherein said primary reflecting means and said secondary reflecting means are fixed in position relative to each other;

tertiary reflection means for directing said beam of light from a light source to said secondary reflection means;

means for controlling said tertiary reflection means in response to a control signal;

wherein said light beam projects through a focal point of said primary reflection means and reflects off the secondary and primary reflection means for transmission to a surface of the three dimensional object with said beam being reflected toward the three dimensional object from said primary reflection means while remaining, within a field of view of said optical system, substantially parallel to an axis, such that said optical system is telecentric, and wherein a change in said control signal results in a corresponding linear change in a position of said beam on said object.

14. An optical system for large volume three dimensional measurement, comprising:

a large surface area primary reflection means for reflecting a beam of light toward a three dimensional object;

secondary reflection means for reflecting said beam of light toward said primary reflection means, wherein said primary reflecting means and said secondary reflecting means are fixed in position relative to each other;

tertiary reflection means for directing said beam of light from a light source to said secondary reflection means;

wherein said light beam projects through a focal point of said primary reflector and reflects off the secondary and primary reflection means for transmission to a surface of the three dimensional object with said beam being reflected toward the three dimensional object from said primary reflection means while remaining, within a field of view of said optical system, substantially parallel to an axis, such that said optical system is telecentric, and wherein a beam spot shape and size of said beam is uniform throughout the field of view of said optical system.

* * * * *

UNITED STATES PATENT AND TRADEMARK OFFICE
CERTIFICATE OF CORRECTION

PATENT NO. : 6,022,115
DATED : February 8, 2000
INVENTOR(S) : Ermanno Borra, Simon Thibault and Stan Szapiel It is certified that error appears in the above-identified patent and that said Letters Patent is hereby corrected as shown below:

Title page,
Item [73], Assignee, after "Université Laval, Ste-Foy, Canada", insert
-- Institut National d'Optique, Ste-Foy, Canada --

Signed and Sealed this

Twentieth Day of May, 2003

JAMES E. ROGAN
*Director of the United States Patent and Trademark Office*